(12) United States Patent
Chen (10) Patent No.: US 12,095,587 B2
(45) Date of Patent: Sep. 17, 2024

(54) HOME APPLIANCE CONTROL METHOD, SERVER, HOME APPLIANCE, AND STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventor: Junji Chen, Foshan (CN)

(73) Assignees: GD MIDEA AIR-CONDITIONING EQUIPMENT CO., LTD., Foshan (CN); MIDEA GROUP CO., LTD, Foshan (CN)

( * ) Notice: Subject to any disclaimer, the term of this patent is extended or adjusted under 35 U.S.C. 154(b) by 372 days.

(21) Appl. No.: 17/423,070

(22) PCT Filed: Mar. 28, 2019

(86) PCT No.: PCT/CN2019/080212
§ 371 (c)(1),
(2) Date: Jul. 14, 2021

(87) PCT Pub. No.: WO2020/155359
PCT Pub. Date: Aug. 6, 2020

(65) Prior Publication Data
US 2022/0103390 A1    Mar. 31, 2022

(30) Foreign Application Priority Data
Jan. 31, 2019  (CN) .......................... 201910088439.7

(51) Int. Cl.
*H04L 12/28* (2006.01)
*G10L 15/22* (2006.01)

(52) U.S. Cl.
CPC ............ *H04L 12/282* (2013.01); *G10L 15/22* (2013.01); *G10L 2015/223* (2013.01)

(58) Field of Classification Search
CPC .. H04L 12/282; G10L 15/22; G10L 2015/223
See application file for complete search history.

(56) References Cited

U.S. PATENT DOCUMENTS

2007/0250765 A1* 10/2007 Chen ....................... G06F 40/18
715/234
2014/0195383 A1*  7/2014 Kim .................... G06F 3/04883
705/26.8
(Continued)

FOREIGN PATENT DOCUMENTS

CN    107886952 A    4/2008
CN    103914041 A    7/2014
(Continued)

OTHER PUBLICATIONS

World Intellectual Property Organization (WIPO) International Search Report and Written Opinion for PCT/CN2019/080212 Mar. 28, 2019 14 pages (with translation).
(Continued)

*Primary Examiner* — Bryan S Blankenagel
(74) *Attorney, Agent, or Firm* — Anova Law Group, PLLC (57) ABSTRACT

A home appliance control method includes receiving, by a server, a voice message sent from a first home appliance, determining appliance information and control information of a second home appliance according to the voice message, generating a control instruction corresponding to the appliance information according to the control information, storing the control instruction, upon receiving a control instruction acquisition request sent from the second home appliance, acquiring the appliance information corresponding to the second home appliance, and sending the stored control instruction corresponding to the appliance informa-
(Continued)

tion to the second home appliance to configure the second home appliance to execute the control instruction.

17 Claims, 3 Drawing Sheets

(56) References Cited

U.S. PATENT DOCUMENTS

| | | | |
|---|---|---|---|
| 2016/0330042 A1* | 11/2016 | Andersen | H04L 12/282 |
| 2016/0381720 A1 | 12/2016 | Baek et al. | |
| 2017/0108236 A1 | 4/2017 | Guan et al. | |
| 2018/0199201 A1* | 7/2018 | Tsuda | H04L 67/131 |
| 2018/0206096 A1 | 7/2018 | Brophy et al. | |
| 2018/0227627 A1* | 8/2018 | Jabara | H04W 60/00 |
| 2019/0028293 A1* | 1/2019 | Hall | H04L 12/2809 |
| 2020/0182539 A1* | 6/2020 | Hwang | F25D 11/02 |
| 2020/0241829 A1* | 7/2020 | Long | G06F 3/16 |
| 2021/0392010 A1* | 12/2021 | Hurabielle | H05B 1/0252 |
| 2022/0286317 A1* | 9/2022 | Arling | G10L 15/22 |

FOREIGN PATENT DOCUMENTS

| | | |
|---|---|---|
| CN | 104780470 A | 7/2015 |
| CN | 106019959 A | 10/2016 |
| CN | 106302093 A | 1/2017 |
| CN | 106444403 A | 2/2017 |
| CN | 106448658 A | 2/2017 |
| CN | 107092196 A | 8/2017 |
| CN | 107276864 A | 10/2017 |
| CN | 107426806 A | 12/2017 |
| CN | 107580237 A | 1/2018 |
| CN | 107612796 A | 1/2018 |
| CN | 107911402 A | 4/2018 |
| CN | 108375924 A | 8/2018 |
| CN | 108490802 A | 9/2018 |
| CN | 108882339 A | 11/2018 |
| CN | 109039842 A | 12/2018 |
| CN | 109104473 A | 12/2018 |
| CN | 109167800 A | 1/2019 |
| EP | 1176503 A2 | 1/2002 |
| WO | 2008082441 A1 | 7/2008 |

OTHER PUBLICATIONS

University of Science and Technology of China, A dissertation for master's degree "Design of Central control module for smart home system based on voice interaction"—Cheng Feng, May 8, 2018.
The China National Intelleectual Property Administration (CNIPA) The First Office Action for 201910088439.7 Feb. 3, 2020 26 Pages (With Translation).
The China National Intelleectual Property Administration (CNIPA) The Second Office Action for 201910088439.7 Aug., 12, 2020 34 Pages (With Translation).

* cited by examiner

HOME APPLIANCE CONTROL METHOD, SERVER, HOME APPLIANCE, AND STORAGE MEDIUM

CROSS-REFERENCE TO RELATED APPLICATIONS APPLICATION

The present application is a National Stage Entry under 35 U.S.C. § 371 of International Application No. PCT/CN2019/080212, filed on Mar. 28, 2019, which claims priority to Chinese patent application No. 201910088439.7 filed on Jan. 31, 2019 and entitled "Home Appliance Control Method, Server, Home Appliance, and Storage Medium." The disclosures of the aforementioned applications are hereby incorporated by reference in their entireties.

TECHNICAL FIELD

The present application relates to the field of home appliances, in particular to a home appliance control method, a server, a home appliance, and a computer readable storage medium.

BACKGROUND

With the continuous development of the voice intelligent recognition technology, the voice technology is applied to the control of home appliances, enabling a user to control a home appliance with voices. At present, during voice control of a home appliance, the user needs to walk close to the home appliance for control, which makes it difficult for the user to realize voice control on home appliances with a long distance. Or if the home appliance is a split air conditioner, a chandelier or the like, it is difficult for the user to approach such an appliance for voice control due to the limitation of installs ion conditions (for example, the appliance is installed at a high place), which will cause inconvenience to the user.

SUMMARY

The main purpose of the present application is to provide a home appliance control method, a server, a home appliance and a computer readable storage medium, to facilitate users to carry out voice control on home appliances.

In order to achieve the above purpose, the present application provides a home appliance control method including following steps:

receiving, by a server, a voice message sent from a first home appliance;

determining appliance information and control information of an appliance to be controlled according to the voice message, and generating a control instruction corresponding to the appliance information according to the control information and storing the control instruction; and upon receiving a request for acquiring a control instruction sent from a second home appliance, acquiring appliance information corresponding to the second home appliance, sending a stored control instruction corresponding to the appliance information to the second home appliance, and configuring the second home appliance to execute the control instruction.

Optionally, after the step of determining appliance information and control information of an appliance to be controlled according to the voice message, and generating a control instruction corresponding to the appliance information according to the control information and storing the control instruction, the home appliance control method further includes:

generating notification information according to the appliance information; and sending the notification information to the first home appliance, and configuring the first home appliance to notify the second home appliance to send the request for acquiring the control instruction to the server according to the notification information.

Optionally, after the step of determining appliance information and control information of an appliance to be controlled according to the voice message, and generating a control instruction corresponding to the appliance information according to the control information and storing the control instruction, the home appliance control method further includes:

sending, by the server according to the appliance information, notification information to the second home appliance to inform the second home appliance to send the request for acquiring the control instruction to the server.

Optionally, the second home appliance transmits the request for acquiring the control instruction to the server at preset time intervals.

Optionally, after the step of upon receiving a request for acquiring a control instruction sent from a second home appliance, acquiring appliance information corresponding to the second home appliance, sending a stored control instruction corresponding to the appliance information to the second home appliance, the home appliance control method further includes:

clearing control instructions that have been sent in the cache, wherein the control instructions are stored in the cache.

Optionally, the control instruction is stored in a cache, after the step of determining appliance information and control information of an appliance to be controlled according to the voice message, and generating a control instruction corresponding to the appliance information according to the control information and storing the control instruction, the home appliance control method further includes:

obtaining generation times and logic information of all control instructions in the cache corresponding to the appliance information; and clearing control instructions with logical conflicts in the cache according to the logic information and the generation times.

Optionally, the step of determining appliance information of an appliance to be controlled according to the voice message includes:

identifying an appliance name from tie voice message, and determining the appliance information of the appliance to be controlled according to the appliance name; or, identifying an area name and an appliance name from the voice message, and determining the appliance information of the appliance to be controlled according to the area name and the appliance name.

Optionally, before the step of receiving, by a server, a voice message sent from a first home appliance, the home appliance control method further includes:

receiving binding information to bind the first home appliance and the appliance to be controlled to a same account or a same group of accounts; and binding the first home appliance and the appliance to be controlled to the same account or the same group of accounts according to the binding information, the server is configured to search for the appliance to be controlled in appliances belong to the same account or the same group of accounts that the first hone appliance belongs upon receiving the request or acquiring the control instruction sent from the second home appliance.

Optionally, before the step of receiving, by a server, a voice message sent from a first home appliance, the home appliance control method further includes:

upon receiving authorization information sent from the appliance to be controlled, determining the first home appliance according to home appliance information in the authorization information, and assigning a control authority of the appliance to be controlled to the first home appliance.

In order to achieve the above purpose, the present application provides a home appliance control method including following steps:

upon a voice message being collected, sending, by a first home appliance, the voice message to a server, wherein, the server determines the appliance information of the appliance to be controlled according to the voice message, and generates and saves a control instruction corresponding to the appliance information;

receiving notification information sent from the server and acquiring appliance information from the notification information; and sending notification information for acquiring a control instruction to a second home appliance corresponding to the appliance information, and configuring the second home appliance to acquire the control instruction from the server after receiving the notification information.

Optionally, after the step of receiving notification information sent front the server and acquiring appliance information from the notification information further includes:

determining, by the first home appliance, whether the appliance information in the received notification information is appliance information of the first home appliance itself;

if yes, sending a request for acquiring a control instruction to the server to acquire the control instruction;

if not, executing, by the first home appliance, the step of sending notification information for acquiring a control instruction to the second home appliance corresponding to the appliance information;

Optionally, prior to the step of upon a voice message being collected, sending, by a first home appliance, the voice message to a server, the home appliance control method further includes:

upon a wake-up word tor the first home appliance being detected, collecting the voice message.

Optionally, the home appliance control method further includes:

regularly sending, by the first home appliance, the request for acquiring the control instruction to the server.

or, upon receiving notification information of acquiring a control instruction sent from a third home appliance, sending, by the first home appliance, the request for acquiring the control instruction to the server.

In order to achieve the above purpose, the present application provides a home appliance control method including following steps:

sending, by a second home appliance, a request for acquiring a control instruction to a server, wherein upon receiving the request for acquiring the control instruction, the server acquires a pre-stored control instruction associated with appliance information corresponding to the second home appliance, and the control instruction is generated according to a voice message uploaded by a first home appliance; and upon receiving the control instruction sent from the server, executing the control instruction.

Optionally, the home appliance control method further includes:

regularly sending, by the second home appliance, the request for acquiring the control instruction to the server;

or, upon receiving notification information, sending, by the second home appliance, the request for acquiring the control instruction to the server, wherein the notification information is sent from the first home appliance or the server.

In order to achieve the above purpose, the present application provides a server including a memory, a processor, and a home appliance control program stored in the memory and executable by the processor, the home appliance control program being executed by the processor to realize the steps of the home appliance control method described above.

In order to achieve the above purpose, the present application provides a home appliance including a memory, a processor, and a home appliance control program stored in the memory and executable by the processor, the home appliance control program being executed by the processor to realize the steps of the home appliance control method described above.

In order to achieve the above purpose, the present application provides a home appliance including a memory, a processor, and a home appliance control program stored in the memory and executable by the processor, the home appliance control program being executed by the processor to realize the steps of the home appliance control method described above.

By providing the home appliance control method, the server, the home appliance and the computer readable storage medium provided by the present application, the server receives a voice message collected by a first home appliance; determines appliance information and control information of an appliance to be controlled according to the voice message, and generates a control instruction corresponding to the appliance information according to the control information and saves the appliance information. Upon receiving a request for acquiring a control instruction sent from a second home appliance, the server acquires appliance information corresponding to the second home appliance, sends the control instruction corresponding to the saved appliance information to the second home appliance, and configures the second home appliance to execute the control instruction. In this way, it facilitates users to carry out voice control on home appliances.

The realization of the purposes, functional features and advantages of the present application will be further explained with reference to the accompanying drawings in combination with the embodiments.

DETAILED DESCRIPTION OF THE EMBODIMENTS

It should be understood that the specific embodiments described herein are for explanatory purposes only and are not intended to limit the application.

The application provides a home appliance control method, which facilitates a user to carry out voice control on home appliances.

Figure 1:
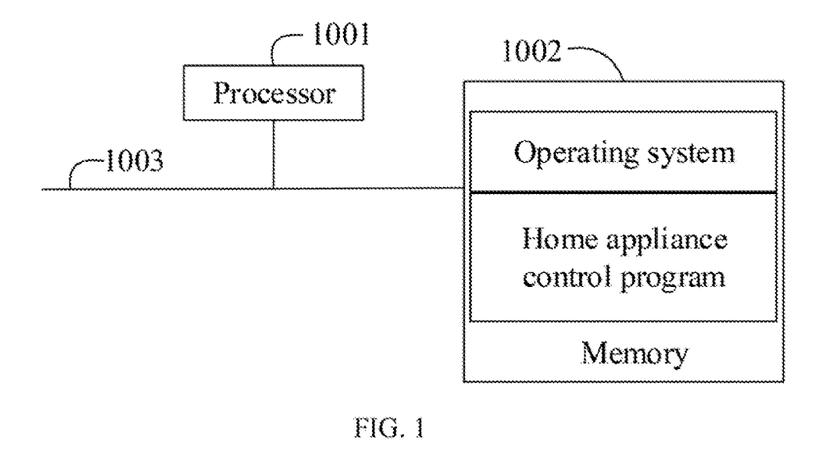
FIG. 1 is a schematic diagram of a hardware operation environment of an example terminal involved in embodiments of the present application.

As shown in FIG. 1, FIG. 1 is a schematic diagram of a hardware operation environment of an example terminal involved in embodiments of the present application;

the terminal of the embodiments of the present application may be a server, or a home appliance, or a control device of the home appliance.

As shown in FIG. 1, the terminal may include a processor 1001, such as a central processing unit, a memory 1002, and a communication bus 1003. The communication bus 1003 is used to realize the connection and communication between components in the terminal. The memory 1002 may be a high-speed random access memory (RAM) or a iron-volatile memory, such as a magnetic disk memory. The memory 1002 may optionally be a storage device independent of the processor 1001 described above.

As will be understood by those skilled in that art, the structure of the terminal shown in FIG. 1 does not constitute a limitation on the terminal of the embodiments of the present application, which may include more or fewer components than illustrated, or a combination of certain components, or a different arrangement of components.

As shown in FIG. 1, the memory 1002, which is a computer storage medium, may include a home appliance control program.

In the terminal shown in FIG. 1, the processor 1001 may be configured to invoke the home appliance control program stored in the memory 1002 and perform the following operations:

receiving, by a server, a voice message sent from a first home appliance;

determining appliance information and control information of an appliance to be controlled according to the voice message, and generating a control instruction corresponding to the appliance information according to the control information and storing the control instruction;

upon receiving a request for acquiring a control instruction sent from a second home appliance, acquiring appliance information corresponding to the second home appliance, sending a stored control instruction corresponding to the appliance information to the second home appliance, and configuring the second home appliance to execute the control instruction.

Optionally, the processor 1001 may invoke the home appliance control program stored in the memory 1002 and also perform the following operations:

generating notification information according to the appliance information;

sending the notification information to tire first home appliance, and configuring the first home appliance to notify the second home appliance to send the request for acquiring the control instruction to the server according to the notification information.

Optionally, the processor 1001 may invoke the home appliance control program stored in the memory 1002 and also perform the following operations:

sending, by the server according to the appliance information, the notification information to the second home appliance to inform the second home appliance to send the request for acquiring the control instruction to the server.

Optionally, the processor 1001 may invoke the home appliance control program stored in the memory 1002 and also perform the following operations:

clearing control instructions that have been sent in the cache, where the control instructions are stored in the cache.

Optionally, the processor 1001 may invoke the home appliance control program stored in the memory 1002 and also perform the following operations:

obtaining generation times and logic information of all control instructions in the cache corresponding to the appliance information;

clearing control instructions with logical conflicts in the cache according to the logic information and the generation times.

Optionally, the processor 1001 may invoke the home appliance control program stored in the memory 1002 and also perform the following operations:

identifying an appliance name from the voice message, and determining the appliance information of the appliance to be controlled according to the appliance name;

or, identifying an area name and an appliance name from the voice message, and determining the appliance information of the appliance to be controlled according to the area name and the appliance name.

Optionally, the processor 1001 may invoke the homo appliance control program stored in the memory 1002 and also perform the following operations:

receiving binding information to bine the first home appliance and the appliance to be controlled to a same account or a same group of accounts;

binding the first home appliance and the appliance to be controlled to the same account or the same group of accounts according to the binding information, so as to search for the appliance to be controlled in appliances belong to the same account or the same group of accounts that the first home appliance belongs under the condition of receiving the request for acquiring the control instruction sent from the second home appliance.

Optionally, the processor 1001 may invoke the home appliance control program stored in the memory 1002 and also perform the following operations:

upon receiving authorization information sent from the appliance to be controlled, determining the first home appliance according to home appliance information in the authorization information, and assigning a control authority of the appliance to be controlled to the first home appliance.

Optionally, the processor 1001 may invoke the home appliance control program stored in the memory 1002 and also perform the following operations:

upon the voice message being collected, sending, by the first home appliance, the voice message to the server, whereby the server determines the appliance information of the appliance to be controlled according to the voice message, and generates and saves the control instruction corresponding to the appliance information;

receiving the notification information sent from the server and acquiring the appliance information from the notification information; and sending the notification information for acquiring a control instruction to the second home appliance corresponding to the appliance information, and configuring the second home appliance to acquire the control instruction from the server after receiving the notification information.

Optionally, the processor 1001 may invoke the home appliance control program stored in the memory 1002 and also perform the following operations:

determining, by the first home appliance, whether the appliance information in the received notification information is appliance information of the first home appliance itself;

if yes, sending a request for acquiring the control instruction to the server to acquire the control instruction;

if not, executing, by the first home appliance, the step of sending the notification information for acquiring a control instruction to the second home appliance corresponding to the appliance information.

Optionally, the processor 1001 may invoke the home appliance control program stored in the memory 1002 and also perform the following operations:

upon a wake-up word for the first home appliance being detected, collecting the voice message.

Optionally, the processor 1001 may invoke the home appliance control program stored in the memory 1002 and also perform the following operations:

regularly sending, by the first home appliance, the request for acquiring the control instruction to the server;

or, upon receiving the notification information of acquiring the control instruction sent from a third home appliance, sending, by the first borne appliance, the request for acquiring the control instruction to the server.

Optionally, the processor 1001 may invoke the home appliance control program stored in the memory 1002 and also perform the following operations:

sending, by the second home appliance, a request for acquiring a control instruction to the server, whereby under the condition of receiving the request for acquiring the control instruction, the server acquires a pre-stored control instruction associated with the appliance information corresponding to the second home appliance, and the control instruction is generated according to the voice message uploaded by the first home appliance; and upon receiving the control instruction sent from the server, executing the control instruction.

Optionally, the processor 1001 may invoke the home appliance control program stored in the memory 1002 and also perform the following operations:

regularly sending, by the second home appliance, the request for acquiring the control instruction to the server;

or, upon receiving the notification information, sending, by the second home appliance, the request for acquiring the control instruction to the server, where the notification information is sent from the first home appliance or the server.

Figure 2:
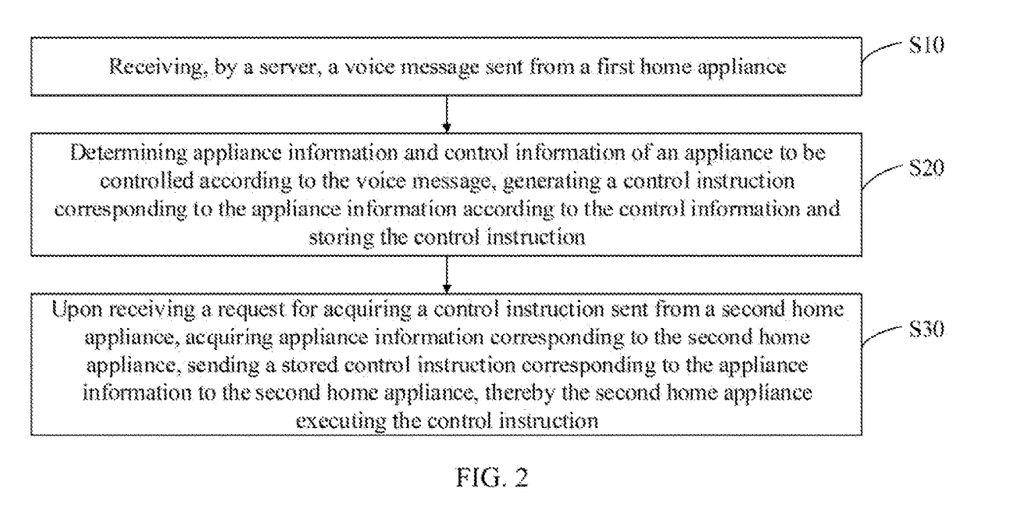
FIG. 2 is a schematic flow diagram of a first embodiment of a home appliance control method according to the present application.

Referring to FIG. 2, in an embodiment, a home appliance control method includes:

Step S10, receiving, by a server, a voice message sent from a first home appliance.

In this embodiment, an example terminal is a server. Home appliances can be televisions, electric fans, air conditioners, washing machines and other home appliances. Each of the home appliances has a voice acquisition function, which can be realized by a built-in voice acquisition module or an external voice acquisition module. When a user speaks voices related to a voice message, the home appliance currently collecting the voices is the first home appliance.

Optionally, the voice message collected by the first home appliance includes an appliance name of a home appliance to be controlled and control information reflecting the user's control intention to control the appliance. For example, a complete voice message can be "turn off the TV" or "turn on the washing machine." where "TV" and "washing machine" are appliance names, and "turn on" and "turn off" are control information.

Figure 5:
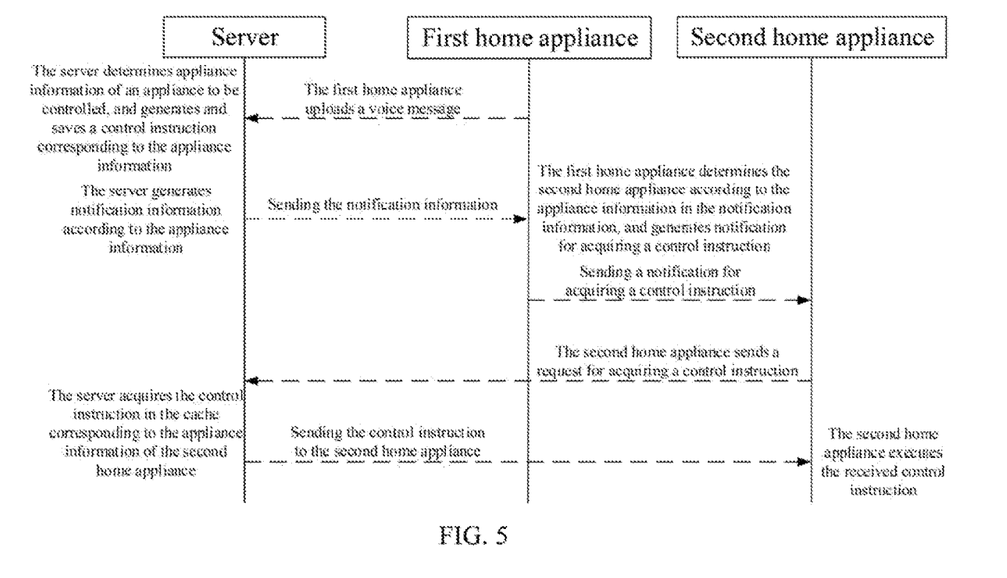
FIG. 5 is schematic diagram showing an example of three-terminal interaction of the home appliance control method of the present application.

Referring to FIG. 5, FIG. 5 is an exemplary diagram of a three-terminal interaction among the server, the first home appliance, and a second home appliance. After the first home appliance collects a voice message, the voice message will be sent to the server, so that the server can receive the voice message collected by the first home appliance.

Step S20, determining appliance information and control information of an appliance to be controlled according to the voice message, generating a control instruction corresponding to the appliance information according to the control information and storing the control instruction.

Optionally, the voice message includes an appliance name and control information. After receiving the voice message, the server can search a corresponding home appliance according to the appliance name in the voice message to obtain appliance information of the home appliance. The appliance information can include a serial number, an ID number and an IP number of the appliance. The home appliance is the appliance to be controlled. After the server determines the appliance information of the home appliance to be controlled, related control words in the control information can be extracted, and then a control instruction matched with the control words is searched in a library of control instructions of the home appliance, and the matched control instruction is associated with the appliance information of the appliance to be controlled and taken as the control instruction to be sent to the appliance to be controlled, and the control instruction is stored in a corresponding control instruction cache of the server assigned for the appliance to be controlled.

Optionally, the voice message includes an area name, an appliance name, and control information. A certain area range (such as a whole house range of a house) is divided into a plurality of preset areas in advance according to actual needs of the user (which can take actual physical partitions of rooms, kitchens, balconies, living rooms, dining rooms, toilets, etc. as a standard), each preset area has a corresponding area name, and each preset area is associated with corresponding home appliances in advance. It should be noted that a preset area can be associated with a plurality of home appliances (e.g., a room can be associated with home appliances such as televisions, air conditioners, electric fans, etc.), and a home appliance can correspond to a plurality of preset areas (e.g., when there is only one washing machine in the whole house range, the washing machine can correspond to all preset areas).

Upon receiving the voice message, the server can first determine a preset area where the appliance to be controlled is located according to the area name in the voice message, and then search for the appliance to be controlled in all home appliances associated with the preset area according to the appliance name. After searching out the appliance to be controlled, the appliance information of the appliance to be controlled can be obtained.

Optionally, the first home appliance and the appliance to be controlled are bound to a same account in advance. The same account may be the user's account registered on the server. The server can only determine the appliance information of the appliance to be controlled which is bound to the same account as the first home appliance does according to the voice message. That is, upon receiving the voice message sent from the first home appliance, the server obtains the appliance information corresponding to the first home appliance (the first home appliance information), and then searches a home appliance bound to the same account corresponding to the first home appliance information according to the appliance name in the voice message.

Optionally, the first home appliance and the appliance to be controlled are bound in advance to a same group of accounts. The same group of accounts may be accounts of a plurality of users associated with each other on the server. For example, among users in a home, the husband's account is bound with the first home appliance, the wife's account is bound with other appliances to be controlled except the first home appliance (i.e., the second home appliances), and the couple's accounts belong to a family scene account group (i.e., the husband's account is associated with the wife's account, and both belong to a same group of accounts). Of course, if the two are the same account, they also belong to the same group of accounts. The server can only determine the appliance information of the appliances to be controlled bound to a same group account as the first home appliance does according to the voice message. That is, upon receiving the voice message sent from the first home appliance, the server obtains the appliance information corresponding to the first home appliance (the first home appliance information), and then searches a home appliance bound to the group of accounts corresponding to the first home appliance information according to the appliance name in the voice message.

Optionally, before receiving the voice message sent from the first home appliance, the server may determine the first home appliance according to the home appliance information in authorization information and assign a control authority of the appliance to be controlled to the first home appliance upon receiving the authorization information sent from the appliance to be controlled. The authorization information may include home appliance information of a plurality of different home appliances, that is, the appliance to be controlled may authorize a plurality of first home appliances. It should be noted that the authorization information includes information of an authorizer (Le., the appliance information of the appliance to be controlled) and information of a grantee (i.e., the appliance information of the first home appliance). The server determines the appliance information of the appliance to be controlled according to the voice message sent from the first home appliance, at the same time, acquire the appliance information corresponding to the first home appliance, and determine whether the first home appliance has the control authority to control the appliance to be controlled according to the appliance information of the first home appliance, if yes, the server executes the step of generating a control instruction of the appliance to be controlled according to the control information; if not, it is indicated that the first home appliance does not have the control authority to control the appliance to be controlled, and the control information obtained by parsing is not processed.

Optionally, the appliance to be controlled needs to grant authority to the first home appliance in advance, and the first home appliance is configured to have the control authority to control the appliance to be controlled. The server can only determine the appliance to be controlled which has granted the control right to the first home appliance according to the voice message, that is, upon receiving the voice message sent from the first home appliance, the server searches among the stored appliance information of the appliances to be controlled, for the home appliance whose control authority has been granted to the first home appliance according to the appliance name in the voice message. It should be noted that the situation that the appliance to be controlled authorizes the first home appliance in advance may be that the appliance to be controlled grants authority to a specific home appliance in advance, and configures the home appliance as the first home appliance having the control authority to control the appliance to be controlled; the situation may also be that each appliance to be controlled grants control authority to all home appliances under a same system (such as being associated with the same server or the same account).

Step S30, upon receiving a request for acquiring a control instruction sent from a second home appliance, acquiring appliance information corresponding to the second home appliance, sending a stored control instruction corresponding to the appliance information to the second home appliance, and configuring the second home appliance to execute the control instruction.

Each appliance to be controlled is assigned with a corresponding cache database in the cache of the server, which stores control instructions not sent to the home appliance to be controlled, and at the same time, the control instructions ore associated with the appliance information of the home appliance.

The second home appliance is the appliance to be controlled. Upon receiving a request for acquiring a control instruction sent from the second home appliance, the server acquires the appliance information corresponding to the second home appliance, searches control instructions stored in the cache according to the acquired appliance information, and then sends the control instructions in the cache not sent to the second home appliance to the second home appliance.

Optionally, the appliance information of the second home appliance is stored in the server, and the server invokes stored related information to acquire the appliance information upon receiving the request for acquiring the control instruction of the second home appliance. Optionally, the appliance information of the second home appliance is added to the request for acquiring the control instruction, and the server can acquire the information of the second home appliance after receiving the request for acquiring and parsing the request for acquiring.

Optionally, before receiving the voice message sent from the first home appliance, the server may bind the first home appliance and the appliance to be controlled to a same account or a same group of accounts according to binding information, upon receiving the binding information of binding the first home appliance and the appliance to be controlled to the same account or the same group of accounts, so that under tire condition of receiving a request for acquiring a control instruction from the second home appliance, the appliance to be controlled is searched among the appliances bound to the same account or the same group of accounts to which the first home appliance belongs, and the control instruction of the found appliance to be controlled in the server cache is obtained, and the control instruction is sent to the second home appliance. It should be noted that the binding information may be sent by a user through a mobile terminal, and the binding information may be sent by each appliance to be controlled. After the user determines a bound device (i.e., the first home appliance) corresponding to the current appliance to be controlled, the binding information can be sent to the server through the appliance to be controlled. It should be understood that the binding information includes the appliance information corresponding to the appliance to be controlled, the appliance information corresponding to the first home appliance, and account information to which the first home appliance and the appliance to be controlled are bound.

It should be noted that a home appliance that currently sends the request for acquiring the control instruction to the server can be taken as the second home appliance, and therefore, the second home appliance may also be the first home appliance.

In this way, the user only needs to send a voice message to the nearest home appliance, or to a home appliance that are most likely to receive the user's voice message at current, any home appliance (including the home appliance responsible for receiving the voice message at current, i.e., the first home appliance) in the whole home appliance system (or within the local area network) can be controlled, which is convenient for the user to carry out voice control on the home appliances. At the same time, each home appliance does not need to pre-install a complex voice recognition system. By integrating the voice recognition functions of all home appliances into the server, the server can carry out voice recognition, so that the home appliances have voice control functions, and the manufacturing cost of the home appliances is effectively saved.

Optionally, after generating the control instruction corresponding to the appliance information, the server generates notification information according to the appliance information and transmits the notification information to the first home appliance. After receiving the notification information, the first home appliance obtains the appliance information of the current home appliance to be controlled (i.e., the second home appliance) by analyzing the notification information, and then sends a notification for acquiring the control instruction to the second home appliance corresponding to the appliance information in the notification information through a local area network. After receiving the notification for acquiring the control instruction, the second home appliance establishes a network connection with the server, and sends the request for acquiring the control instruction to the server to acquire the control instruction corresponding to the second home appliance cached in the server. In this way, the home appliances in the local area network do not need to keep the network connections with the server all the time. Only when a home appliance needs to send a voice message or a request for acquiring a control instruction to the server, the network connection with the server is established. At the same time, when the home appliance receives the notification information or obtain the control instruction sent from the server, the connection with the server is disconnected, and the remaining interaction between the home appliances only needs to be carried out through the local area network, thus effectively saving network resources and flow cost generated by the interaction between the home appliances and the server.

Only when the server receives the request for acquiring the control instruction of the appliance to be controlled will the control instruction in the cache be sent to the appliance to be controlled. In this way, the server can cache multiple control instructions of each home appliance at the same time. It should be noted that, when the server stores each control instruction of the appliances to be controlled, the generation time of each control instruction is stored together at the same time. Upon receiving the request for acquiring the control instruction from the second home appliance, control instructions are sequentially sent to the second home appliance according to a sequence of generation times of the control instructions, so that a control instruction with an earlier generation time can be sent to the second home appliance first, and control conflicts are voided.

Optionally, after each control instruction is generated, the server may send the notification information to the second home appliance according to the appliance information of the appliance to be controlled, to inform the second home appliance to send the request for acquiring the control instruction to the server. The server may send the notification information to each home appliance regularly. Of course, before sending the notification information to a home appliance, the server first detects whether a control instruction of the home appliance is currently cached, and the server only sends the notification information to the home appliance when the control instruction of the home appliance is detected to be cached.

Optionally, each time saving a control message, the server may obtain the generation times of all control instructions of appliance information corresponding to the control information in the cache and logic information of a home appliance corresponding to the appliance information, and clear all control instructions having logical conflicts with each other according to the logic information and the generation times.

Optionally, each home appliance may send the request for acquiring the control instruction to the server at preset time intervals, that is, regularly request to acquire the control instruction cached in the server. The preset time intervals may be every minute, every ten minutes, every fifteen minutes, or the like.

It should be noted that the server can have a control logic discrimination mechanism to simulate the control execution of home appliances. According to a principle that the control instruction generated earlier is executed first, when a subsequent control instruction is added to the cache, it is needed to determine whether there is a logical conflict with the control instruction cached first. The logical conflict may be a conflict between opposite instructions, such as, a startup instruction and a shutdown instruction, a volume up instruction and a volume down instruction. The conflicts between the opposite instructions can be eliminated by removing the opposite instructions. Of course, since some control instructions are related to a startup state of home appliances, when the startup instruction is cleared, these control instructions are also cleared accordingly. The logic conflict may be an operation mode conflict. For example, when a home appliance only supports to run one operation mode at one time, and the previously cached control instruction corresponds to the first mode and the later cached control instruction corresponds to the second mode, the control instruction corresponding to the first mode is cleared and the control instruction corresponding to the second mode is retained.

In this way, after the server generates a control instruction for an appliance to be controlled, as the server can cache control instructions, the server can update an instruction library in real time according to the generated control instruction. When the user needs to change the control of the appliance to be controlled, the control instructions need not be sent to the corresponding appliance to be controlled one by one, thus avoiding the appliance to be controlled from executing redundant control instructions and causing waste of resources.

After the server sends the saved control instruction to the second home appliance, the sent control instruction can be cleared from the cache.

In one embodiment, the server receives a voice message collected by the first home appliance, determines appliance information and control information of an appliance to be controlled according to the voice message, and generates a control instruction corresponding to the appliance information according to the control information and save the control instruction. Upon receiving a request for acquiring a control instruction sent by live second home appliance, the server acquires appliance information corresponding to the second home appliance, sends the saved control instruction corresponding to the appliance information to the second home appliance, configuring the second home appliance to execute the control instruction. In this way, even if a user wants to control a target home appliance with a long distance through voice, the voice message can be collected by the home appliance with the nearest distance at present, so as to realize voice control of the target home appliance and realize convenient voice control of the home appliances by the user.

Figure 3:
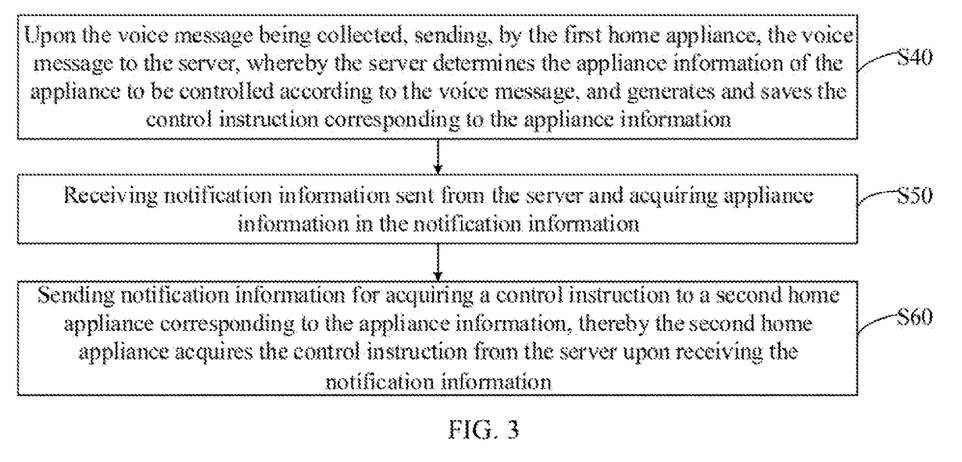
FIG. 3 is a schematic flow diagram of a second embodiment of a home appliance control method according to the present application.

In a second embodiment, as shown in FIG. 3, on the basis of the above-mentioned embodiment shown in FIG. 2, the home appliance control method includes the following steps:

Step S40, upon the voice message being collected, sending, by the first home appliance, the voice message to the server, whereby the server determines the appliance information of the appliance to be controlled according to the voice message, and generates and saves the control instruction corresponding to the appliance information.

Step S50, receiving notification information sent from the server and acquiring appliance information in the notification information.

Step S60, sending notification information for acquiring a control instruction to a second home appliance corresponding to the appliance information, and configuring the second home appliance to acquire the control instruction from the server upon receiving the notification information.

In this embodiment, the example terminal is the first home appliance, and the first home appliance is a home appliance that currently collects voices when the user speaks voices related to a voice message.

Optionally, when the first home appliance detects a wake-up word for the first home appliance, the collection of the voice message is started. The wake-up word is a preset phonetic phrase, which can be "Hello" or "Classmate Xiaolan," and can be set by the user according to actual needs. The voice control mechanism of each home appliance in the local area network (or in the home appliance system) can be preset with a corresponding wake-up word. Only when the wake-up word is detected, the home appliance, serving as the first home appliance, will collect the voice message sent by the user.

After the first home appliance collects the voice message, the voice message can be sent to the server, and the server can determine the appliance information of the appliance to be controlled according to the voice message, and generate and save the control instruction corresponding to the appliance information. At the same time, the server can generate notification information according to the determined appliance information of the appliance to be controlled, and send the notification information to the first home appliance.

Upon receiving the notification information sent from the server, the first home appliance can determine the second home appliance to be controlled according to appliance information by acquiring the appliance information in the notification information, and send notification information for acquiring a control instruction to the second home appliance. The second home appliance can be configured to send a request for acquiring the control instruction to the server after receiving the notification information, so as to acquire the control instruction cached in the server.

Optionally, upon receiving the notification information sent from the server, the first home appliance can first determine whether the second home appliance to be controlled is the first homo appliance itself according to the appliance information in the notification information, that is, determine whether the appliance information in the received notification information is the appliance information of the first home appliance. If yes, it means that the first home appliance is the current appliance to be controlled, and the first home appliance sends the request for acquiring the control instruction to the server to acquire the control instruction corresponding to the first home appliance cached in the server. If not, it indicates that the current appliance to be controlled is a home appliance other than the first home appliance, namely a second home appliance, and the first home appliance sends the notification information for acquiring the control instruction to the second home appliance corresponding to the appliance information, and configures the second home appliance to acquire the control instruction from the server upon receiving the notification information.

Optionally, since each home appliance can serve as a home appliance to be controlled, the first home appliance can send the request for acquiring the control instruction to the server at each preset time interval to acquire the control instruction cached in the server and execute the control instruction. It should be noted that the preset time interval may be one minute, ten minutes, fifteen minutes, or the like.

Optionally, since each home appliance can serve as a home appliance to be controlled (i.e., a second home appliance), the first home appliance can also receive notification information sent from other home appliances and send a request for acquiring a control instruction to the server after receiving the notification information. It should be noted that when the first home appliance serves as a second home appliance, the notification information may be sent by a third home appliance, that is, when the first home appliance serves as a second home appliance, the home appliance currently responsible for receiving the user's voice message may be a third home appliance.

In one embodiment, the first home appliance sends the voice message to the server after the voice message is collected, whereby the server determines the appliance information of the appliance to be controlled according to the voice message, and generates and saves the control instruction corresponding to the appliance information; the first home appliance receives notification information sent from the server and acquires appliance information in the notification information, sends notification information for acquiring the control instruction to the second home appliance corresponding to the appliance information, and configuring the second home appliance to acquire the control instruction from the server upon receiving the notification information. In this way, it is convenient for the user to carry out voice control on home appliances.

Figure 4:
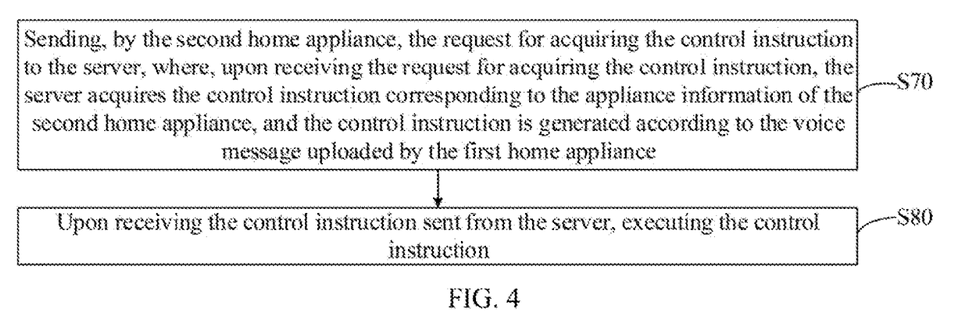
FIG. 4 is a schematic flow diagram of a third embodiment of a home appliance control method according to the present application.

In the third embodiment, as shown in FIG. 4, on the basis of the above-mentioned embodiments of FIGS. 2 to 3, the home appliance control method includes the following steps:

Step S70, sending, by the second home appliance, the request for acquiring the control instruction to the server, where, upon receiving the request for acquiring the control instruction, the server acquires the control instruction corresponding to the appliance information of the second home appliance, and the control instruction is generated according to the voice message uploaded by the first home appliance.

Step S80, upon receiving the control instruction sent from the server, executing the control instruction.

In this embodiment, the example terminal is the second home appliance. The second home appliance is the appliance to be controlled that currently sends the request for acquiring the control instruction to the server.

Optionally, the second home appliance may send the request for acquiring the control instruction to the server regularly at each preset time interval to acquire the control instruction cached in the server and execute the control instruction. It should be noted that the preset time interval may be one minute, ten minutes, fifteen minutes, or live like.

Optionally, the second home appliance may send the request for acquiring the control instruction to the server upon receiving the notification information, where the notification information is sent from the first home appliance or the server. That is, the server receives the voice message uploaded by the first home appliance, determines the appliance information and the control information of the second home appliance according to the voice message, and generates the control instruction corresponding to the appliance information according to the control information and saves the control instruction. After that, the server may generate the notification information according to the appliance information, send the notification information to the first home appliance, and configure the first home appliance to notify the second home appliance to send the request for acquiring the control instruction to the server according to the notification information. The server may cither directly send the notification information to the second home appliance according to live appliance information, so as to inform the second home appliance to send the request for acquiring the control instruction to the server.

Alter the second home appliance sends the request for acquiring the control instruction to the server, and upon receiving the request for acquiring the control instruction sent from the second home appliance, the server acquires the appliance information corresponding to the second home appliance, sends the saved control instruction corresponding to the appliance information to the second home appliance, and configures the second home appliance to execute the control instruction.

After the second home appliance receives the control instruction sent from the server based on the request for acquiring the control instruction, the second home appliance executes the acquired control instruction.

In one embodiment, the second home appliance sends the request for acquiring the control instruction to the server, where the server acquires the control instruction corresponding to the appliance information of the second home appliance upon receiving the request for acquiring the control instruction, and the control instruction is generated according to the voice message uploaded by the first home appliance. When the control instruction sent from the server is received, the control instruction is executed, thus it is convenient for users to carry out voice control on home appliances.

In addition, the present application also proposes a server including a memory, a processor, and a home appliance control program stored in the memory and executable by the processor, when the processor implements the home appliance control program, the steps of the home appliance control method as described in the above embodiments are realized.

In addition, the present application also proposes a home appliance including a memory, a processor, and a home appliance control program stored in the memory and executable by the processor, when the processor implements the home appliance control program, the steps of the home appliance control method as described in the above embodiments are realized.

In addition, the present application also proposes a computer-readable storage medium including a home appliance control program which, when executed by a processor, implements the steps of the home appliance control method as described in the above embodiments.

The above numbering of the embodiments of the present application is for description only and does not represent the advantages and disadvantages of those embodiments.

From the above description of embodiments, it will be apparent to those skilled in the art that the method of the above embodiments can be implemented by means of software plus a necessary general hardware platform, and of course can also by means of hardware, but in many cases the former is a preferred embodiment. Based on this understanding, the technical solutions of the present application can be embodied in the form of software products in essence or parts that contribute to the existing art. The computer software product is stored in a storage medium (e.g., a ROM/RAM, a magnetic disk, an optical disk) as described above, and includes instructions to perform the methods described in various embodiments of the present application with a configured terminal device (which may be a television, a mobile phone, a computer, a server, an air conditioner, a network device, etc.).

The above are only preferred embodiments of the present application, and do not limit the scope of the present application. Any equivalent structure or equivalent process transformation made by using the contents of the specification and drawings of the present application, or directly or indirectly applications in other related technical fields, are similarly included in the claimed scope of the present application.

What is claimed is:

1. A home appliance control method comprising:
    establishing a network connection between a server and a first home appliance having no voice recognition function;
    receiving, by the server through the network connection established between the server and the first home appliance, a voice message sent from a first home appliance, the first home appliance collecting the voice message from a user and sending the voice message to the server without performing voice recognition;
    upon receiving the voice message, at the server, performing voice recognition on the voice message to obtain an appliance name and searching among stored appliance information for a second home appliance that has granted a control authority to the first home appliance according to the appliance name in the voice message, the second home appliance having no voice recognition function;

determining, by the server, appliance information and control information of the second home appliance according to the voice message;

generating, by the server, a control instruction corresponding to the appliance information according to the control information;

storing, by the server, the control instruction;

in response to the control instruction being generated or stored, establishing a network connection between the server and the second home appliance;

upon receiving a control instruction acquisition request sent from the second home appliance through the network connection between the server and the second home appliance, acquiring, by the server, the appliance information corresponding to the second home appliance; and sending, by the server, the stored control instruction corresponding to the appliance information to the second home appliance to configure the second home appliance to execute the control instruction.

2. The home appliance control method according to claim 1, further comprising, after storing the control instruction:

generating notification information according to the appliance information; and sending the notification information to the first home appliance to configure the first home appliance to notify, according to the notification information, the second home appliance to send the control instruction acquisition request to the server.

3. The home appliance control method according to claim 1, further comprising, after storing the control instruction:

sending, by the server according to the appliance information, notification information to the second home appliance to inform the second home appliance to send the control instruction acquisition request to the server.

4. The home appliance control method according to claim 1, wherein the second home appliance is configured to transmit the control instruction acquisition request to the server at preset time intervals.

5. The home appliance control method according to claim 1, further comprising, after sending the stored control instruction to the second home appliance:

clearing the control instruction from a cache that stores the control instruction.

6. The home appliance control method according to claim 1, wherein the control instruction is one of a plurality of control instructions stored in a cache;

the method further comprising, after storing the control instruction:

obtaining generation times and logic information of the plurality of control instructions in the cache corresponding to the appliance information; and clearing logically conflicting ones of the plurality of control instructions in the cache according to the logic information and the generation times.

7. The home appliance control method according to claim 1, wherein determining the appliance information of the second home appliance according to the voice message includes:

identifying the appliance name from the voice message, and determining the appliance information of the second home appliance according to the appliance name; or identifying an area name and the appliance name from the voice message, and determining the appliance information of the second home appliance according to the area name and the appliance name.

8. The home appliance control method according to claim 1, further comprising, before receiving the voice message:

receiving binding information to bind the first home appliance and the second home appliance to a same account or a same group of accounts; and binding the first home appliance and the second home appliance to the same account or the same group of accounts according to the binding information;

wherein the server is configured to search for the second home appliance in appliances belong to the same account or the same group of accounts as the first home appliance upon receiving the control instruction acquisition request sent from the second home appliance.

9. The home appliance control method according to claim 1, further comprising, before receiving the voice message:

upon receiving authorization information sent from the second home appliance, determining the first home appliance according to home appliance information in the authorization information, and assigning the control authority of the second home appliance to the first home appliance.

10. A non-transitory computer readable storage medium storing a home appliance control program that, when executed by a processor of a server, causes the server to perform the home appliance control method according to claim 1.

11. A server comprising:

a memory storing a home appliance control program; and a processor configured to execute the program to cause the server to perform the home appliance control method according to claim 1.

12. A home appliance control method comprising:

upon collecting a voice message, sending, by a first home appliance without performing voice recognition on the voice message, the voice message to a server, through a network connection established between the server and the first hone appliance, for the server to generate a control instruction according to the voice message, wherein the server generates the control instruction by performing the voice recognition on the voice message;

receiving notification information sent from the server through the network between the server and the first home appliance;

disconnecting the network between the server and the first home appliance;

acquiring appliance information from the notification information;

sending, by the first home appliance through a local area network, control instruction acquisition notification information to a second home appliance corresponding to the appliance information, wherein the second home appliance is configured to send a control instruction acquisition request to the server through a network, the network being established between the server and the second home appliance in response to the control instruction being generated or stored, to acquire the control instruction generated by the server according to the voice message sent by the first home appliance, and wherein the first home appliance and the second home appliance do not have a voice recognition function.

13. The home appliance control method according to claim 12, further comprising, after acquiring the appliance information from the notification information:

determining, by the first home appliance, whether the appliance information in the received notification information is appliance information of the first home appliance; and upon determining, by the first home appliance, that the appliance information in the notification information is the appliance information of the first home appliance, sending, by the first home appliance, a control instruction acquisition request to the server to acquire the control instruction;

wherein sending the control instruction acquisition notification information to the second home appliance is performed upon determining, by the first home appliance, that the appliance information in the notification information is not the appliance information of the first home appliance.

14. The home appliance control method according to claim 12, further comprising, prior to sending the voice message to the server:

upon detecting a wake-up word for the first home appliance, collecting the voice message.

15. The home appliance control method according to claim 12, further comprising:

regularly sending, by the first home appliance, a control instruction acquisition request to the server; or upon receiving control instruction acquisition notification information from a third home appliance, sending, by the first home appliance, the control instruction acquisition request to the server.

16. A non-transitory computer readable storage medium storing a home appliance control program that, when executed by a processor of a home appliance, causes the home appliance to act as the first home appliance to perform the home appliance control method according to claim 12.

17. A home appliance comprising:

a memory storing a home appliance control program; and a processor configured to execute the program to cause the home appliance to act as the first home appliance to perform the home appliance control method according to claim 12.

* * * * *